United States Patent [19]

Juzswik

[11] Patent Number: 4,705,997
[45] Date of Patent: Nov. 10, 1987

[54] BIDIRECTIONAL MOTOR DRIVE CIRCUIT

[75] Inventor: David L. Juzswik, Dearborn Heights, Mich.

[73] Assignee: United Technologies Automotive, Inc., Dearborn, Mich.

[21] Appl. No.: 832,486

[22] Filed: Feb. 21, 1986

[51] Int. Cl.$^4$ .............................................. H02P 1/04
[52] U.S. Cl. .................... 318/341; 318/443; 318/444; 318/293
[58] Field of Search ............................ 318/441–446, 318/449, 450, 466, 467, 468, 483, DIG. 2, 293, 258, 256, 257, 584, 294, 280, 281, 282, 283, 284, 285, 286, 266, 291, 484, 374, 375, 376, 371, 299, 261, 269, 273; 15/250.02; 307/584

[56] References Cited

U.S. PATENT DOCUMENTS

| | | | |
|---|---|---|---|
| 3,924,168 | 12/1975 | Woodward | 318/257 |
| 4,134,051 | 1/1979 | Pelchat et al. | 318/282 |
| 4,374,348 | 2/1983 | Shimura et al. | 318/443 |
| 4,403,178 | 9/1983 | Kaminski | 318/484 |
| 4,438,378 | 3/1984 | Tanaka | 318/280 |
| 4,454,454 | 6/1984 | Valentine | 318/293 |
| 4,476,416 | 10/1984 | Licata et al. | 318/293 X |
| 4,523,134 | 6/1985 | Kinoshita et al. | 318/599 X |
| 4,544,869 | 10/1985 | Pittaway | 318/293 |
| 4,562,393 | 12/1985 | Loyzim et al. | 318/341 X |
| 4,568,863 | 2/1986 | Ruof | 318/261 X |
| 4,575,662 | 3/1986 | Lehnhoff | 318/293 X |
| 4,581,565 | 4/1986 | Pelt et al. | 318/294 |
| 4,616,305 | 10/1986 | Damiano et al. | 318/293 X |

Primary Examiner—William M. Shoop, Jr.
Assistant Examiner—Shik Luen Paul Ip
Attorney, Agent, or Firm—Stephen A. Schneeberger

[57] ABSTRACT

A drive circuit is provided for a bidirectional DC inductive motor, as may be used for automotive window wipers and the like. Four power MOSFETS are connected in an H-bridge configuration with the motor and a DC source. A pair of input terminals receives respective direction-controlling logic signals. Respective intermediate switching circuits are connected between each input terminal and the high-side and low-side power MOSFETS connected to the same motor terminal for controlling those two power MOSFETS in a complementary manner. A braking signal may also be applied to the input terminals. A third terminal receives a pulse-width modulated control signal and extends it, via appropriate circuitry, to an appropriate one of the low-side power MOSFETS for speed regulation. The values of certain components of the drive circuitry are selected to minimize cross-conduction between certain power MOSFETS and to optimally accommodate the inductive effects of the motor and leads.

13 Claims, 13 Drawing Figures

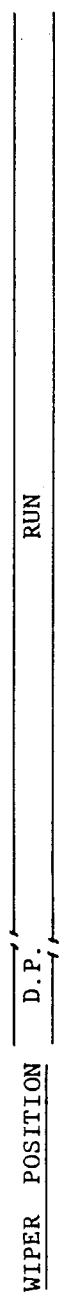
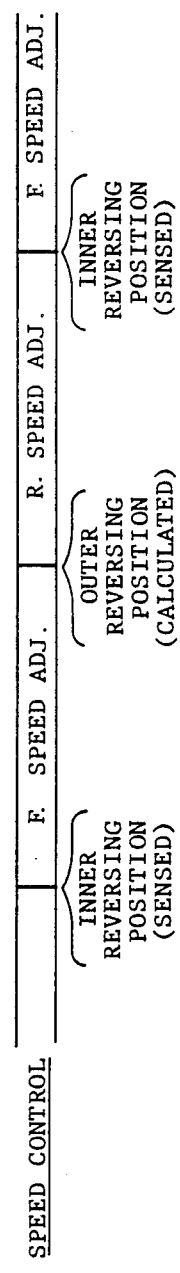
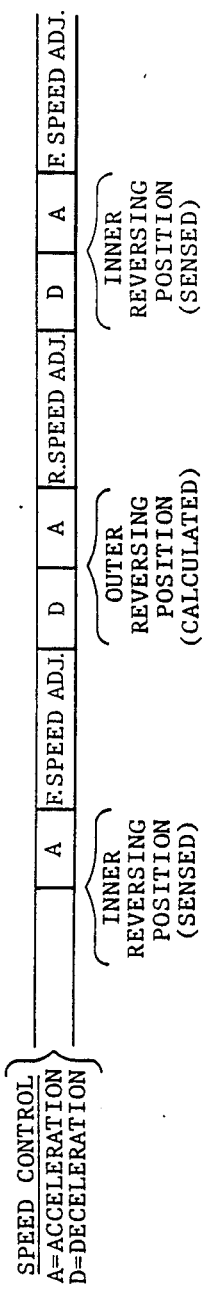
FIG.5A  WIPER POSITION
FIG.5B  RUN CAM FEEDBACK
FIG.5C  SPEED CONTROL
FIG.6  SPEED CONTROL
A=ACCELERATION
D=DECELERATION

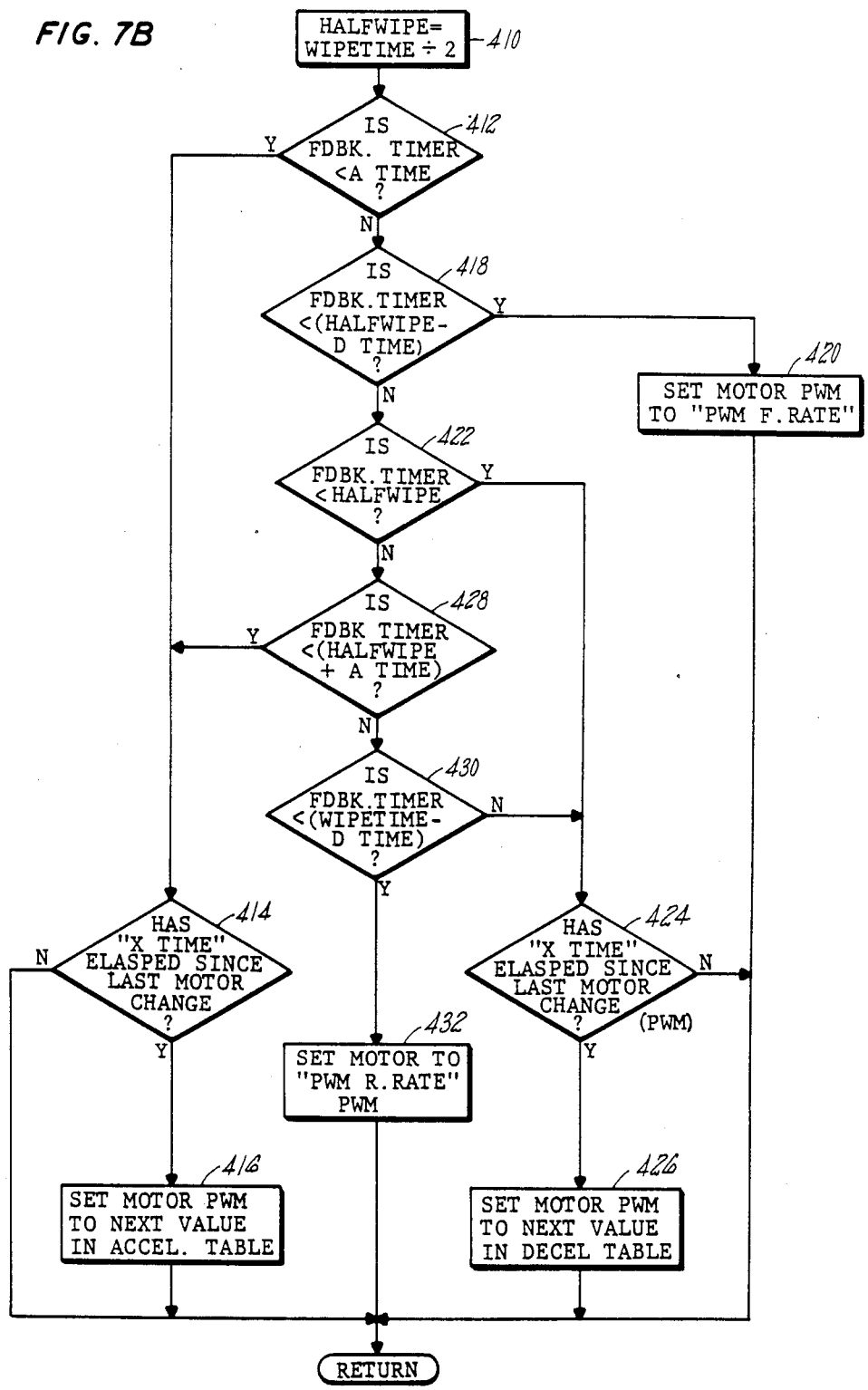

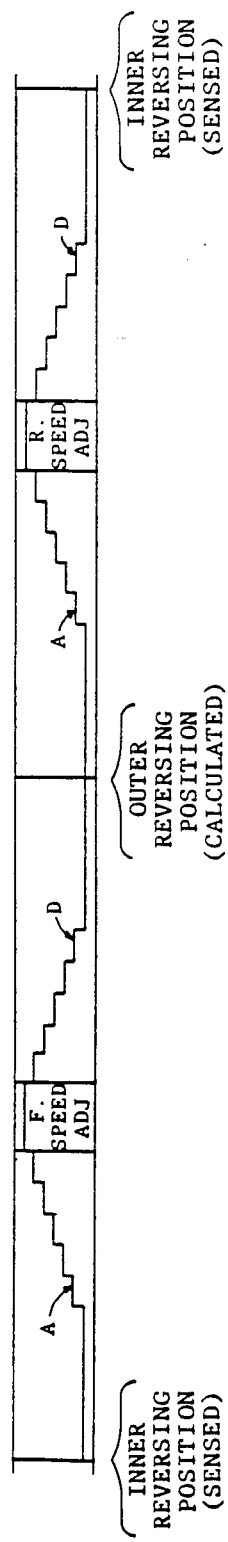

BIDIRECTIONAL MOTOR DRIVE CIRCUIT

CROSS-REFERENCE TO RELATED PATENT APPLICATIONS

This application is related to the subject matter disclosed and claimed in patent application Ser. No. 832,275, now U.S. Pat. No. 4,663,575 issued May 5, 1987 for SPEED CONTROL FOR A WINDOW WIPER SYSTEM by David L. Juzswik and John E. Lahiff, said application filed on even date herewith and assigned to the same assignee.

TECHNICAL FIELD

The present invention relates to the control of a motor and more particularly to an electronic control system for small bidirectional DC inductive motors.

BACKGROUND ART

The use of small, bidirectional DC inductive motors is relatively widespread, finding use in a variety of machines and equipment and particularly in various applications within automotive vehicles. One such common application is the motor which drives the wiper or wipers on the window or windshield of automotive vehicles. In the control of such motors, it is often an objective to provide accurate and reliable control of the motor utilizing drive control circuitry which is relatively durable and inexpensive. Although the invention will be described in the context of its application to a wiper motor, it will be understood that its applicability extends to those small bidirectional DC inductive motors which drive other loads as well.

A relatively traditional wiper system for the window of an automotive vehicle is depicted in FIG. 1 herein. That system includes a two-speed wiper motor 10, a cammed Run switch 112, a cammed Park switch 114, relatively conventional drive and control electronics 116 which employed bipolar transistors and electromechanical relays, several ganged high-current wiper mode switches, generally represented as 118 and a potentiometer 120 for adjusting the delay interval for intermittent operation. The cammed Run switch 112 carries the current of wiper motor 110 while the wiper, or wipers, represented by reference numeral 122 is sweeping across the windshield. The cammed Park switch 114 is used to reverse the direction of rotation of wiper motor 110 which in turn brings the wiper 122 to the "Depressed Park" position. The forward and return sweeping motion of the wiper 122 across a windshield is performed in the linkage between it and the wiper motor 110 such that the motor is normally only rotated in a single direction, but is reversed to move the wiper 122 into the "Depressed Park" position. Other wiper systems exist in which the linkage to the wipers and the control of the motor is such that the direction of rotation of the motor is reversed for the forward and return sweeping motion.

A recently-developed wiper control system is described in U.S. Pat. No. 4,578,591 for CONTROL CIRCUIT FOR AUTOMOTIVE ACCESSORY SYSTEM by Floyd et al, issued March 26, 1986, and having the same assignee as the present invention. That application describes in somewhat greater detail the form of motor drive circuitry that has existed in the prior art. Further, that application describes a system in which signals from input switches are used in conjunction with a microcomputer-based controller for directing the control of the windshield wipers. The control signals provided by the microcomputer were conducted via a serial multiplex link and respective remote multiplex (REMUX) controllers or slave units to the associated motor drive circuitry.

Still further, U.S. Pat. No. 4,454,454 to Valentine for MOSFET "H" SWITCH CIRCUIT FOR A DC MOTOR describes what is characterized as an "improved MOSFET H switch circuit for a DC motor". That circuit employs four power MOSFETS connected in an "H" switch, or bridge, configuration for providing bidirectional control of a fractional horsepower DC motor, as for instance used to drive windshield wipers. That motor drive circuit is characterized as providing various advantages over the use of bipolar transistors for reversing the motor supply voltage for bidirectional control and/or for speed control of the motor. Indeed, the utilization of power MOSFETS in an H-bridge configuration does appear to provide advantages over the utilization of other types of switching devices. While that patent does disclose the use of power MOSFETS in an H-bridge configuration for controlling the direction of rotation and further provides for the use of pulse-width modulated control signals for regulating speed, the manner in which the power MOSFETS are controlled appears to provide little or no opportunity for braking the motor, if desired. Moreover, it does not appear that full consideration has been given to the need to minimize the potential for cross-conduction between power MOSFETS connected to a common terminal of the motor nor is there a full accommodation for or recognition of the effects of the inductance in the circuit on the control dynamics of the motor and on the integrity of the power MOSFETS.

Accordingly, it is a principal object of the present invention to provide an improved motor drive circuit for a bidirectional inductive DC motor which employs power MOSFETS in an H-bridge configuration and which optimizes the utility of the control and the integrity of the drive circuitry.

It is a further object of the present invention to provide an improved motor drive circuit of the type mentioned and which readily accommodates control signals received from a microcomputer for bidirectional control and for speed regulation using pulse-width modulation. Included within this object is the provision of a drive control circuit which readily accommodates a braking capability. Also within this object is the provision of a motor drive circuit which minimizes potentially-destructive cross-conduction between power MOSFETS and which accommodates the inductive characteristics of the motor and leads in an optimized manner.

DISCLOSURE OF INVENTION

In accordance with the invention there is provided an improved motor drive circuit for a bidirectional inductive DC motor, the motor having first and second terminals for operative connection with a source of DC electrical power and the drive circuitry being adapted to be connected in series with the motor terminals across the source of DC electrical power. The motor drive circuitry includes four power MOSFETS operatively connected to the motor terminals in H-bridge configuration across the power source, the four power MOSFETS including first and second high-side power MOSFETS operatively connected to the first and second motor terminals respectively, and first and second low-side powwer MOSFETS operatively connected to the first and second motor terminals respectively. The drive circuit further includes first and second input terminals and first and second intermediate switching circuitry. The input terminals receive respective control signals, each of which is one of two possible logic states. The first intermediate switching circuitry is operatively connected between the first input terminal and the gates of the first high-side and first low-side power MOSFETS for controlling conduction of the first high-side and the first low-side power MOSFETS in a substantially complementary manner. The second intermediate switching circuitry is operatively connected between the second input terminal and the gates of the second high-side and second low-side power MOSFETS for controlling conduction of the second high-side and the second low-side power MOSFETS also in a substantially complementary manner.

The first and second intermediate switching circuits each include a series pair of control MOSFETS which are connected between a respective input terminal and the gate of one of the respective high-side and low-side power MOSFETS. Further, one of the control MOSFETS of each pair is connected between the respective input terminal and the gate of the other of the respective high-side and low-side power MOSFETS. The respective control MOSFETS of the first and second intermediate switching circuits have predetermined maximum threshold voltages and the respective power MOSFETS have predetermined minimum threshold voltages which are higher than the maximum threshold voltages of the control MOSFETS such as to impede cross-conduction between respective high-side and low-side power MOSFETS. Moreover, the power MOSFETS each include respective inherent input capacitances and the first and second intermediate switching circuits include respective resistances which are connected to the gates of the respective power MOSFETS and are configured and preselected to provide, in combination with the respective input capacitances, turn-on time constants which are longer than the corresponding turn-off time constants for the respective power MOSFETS thereby to further impede cross-conduction between respective high-side and and low-side power MOSFETS.

The control signals received at the first and second input terminals may concurrently be of the same logic state, that state being operative to effect conduction of the first and second high side power MOSFETS or the first and second low-side power MOSFETS concurrently for braking the motor. A third input terminal is also provided for receiving a pulse-width modulated control signal, and circuit means are provided for extending that pulse-width modulated control signal only to each of the first and second low-side power MOSFETS for controlling the speed of the motor. More specifically, normally only one of the first and second low-side power MOSFETS is rendered conductive at any particular time by the control signals received at the first and second input terminals, and the circuitry which extends the pulse-width modulated control signals to the first and second low-side power MOSFETS operates to regulate the conduction only of that one of the first and second low-side power MOSFETS which has been rendered conductive by the control signals at the first and second input terminals.

Speed control of the motor is provided by utilizing a pulse-width modulated control signal which has a relatively slow repetition rate in order to exploit the inductive characteristics of the motor in an optimal manner. That repetition rate is less than about 500 Hz and is preferably in the range of 30–75 Hz. Such relatively-slow repetition rate further enables a relativley-slow switching rate for the power MOSFETS to minimize the adverse effects of inductive transients. The duration of any "off" portion of the duty cycle of the pulse-width modulated control signal is made at least long enough that the body diodes inherent in each power MOSFET have time to recover. Further, assuming a transient protection circuit is included to prevent voltage transients greater than a predetermined amplitude from being passed to the drive circuitry, at least the high-side power MOSFETS are selected to have a minimum breakdown voltage which is at least twice the amplitude of the transient protection. Although suitable for use with other similar types of motors, the motor drive circuitry of the present invention is particularly suited for use with automotive motors, as for instance window wiper motors.

BRIEF DESCRIPTION OF THE DRAWINGS

FIG. 5A is a timing diagram showing the wiper in its "Depressed Park" mode and in its Run mode;

FIG. 5B is a corresponding waveform of the logic signal fed back to the control system by the cammed Run switch;

FIG. 5C is a corresponding timing diagram depicting the "Forward" and "Return" Speed Adjustment modes during the Run mode;

FIG. 6 is timing diagram similar to that of FIG. 5C, but depicting modifications of the Forward and Return Speed Adjustment modes in accordance with an other embodiment of the control system;

FIG. 7B is a generalized flow diagram of another control routine called by the routine of FIG. 7 according to a particular embodiment of the invention; and FIG. 8 is a timing diagram similar to that of FIG. 6 and depicting a speed profile which includes an apparent dwell.

BEST MODE FOR CARRYING OUT THE INVENTION

As used herein when referring to the wiper control system and its mode of operation, the following terms are synonymous and may be used interchangeably: "sweep" with "stroke"; "forward/reverse" with "forward/return"; "inner reversing position" with "parking position"; "FET" with "MOSFET"; "cammed run switch" with "Run cam"; "on" with "conducting"; and "off" with "nonconducting".

Figure 1:
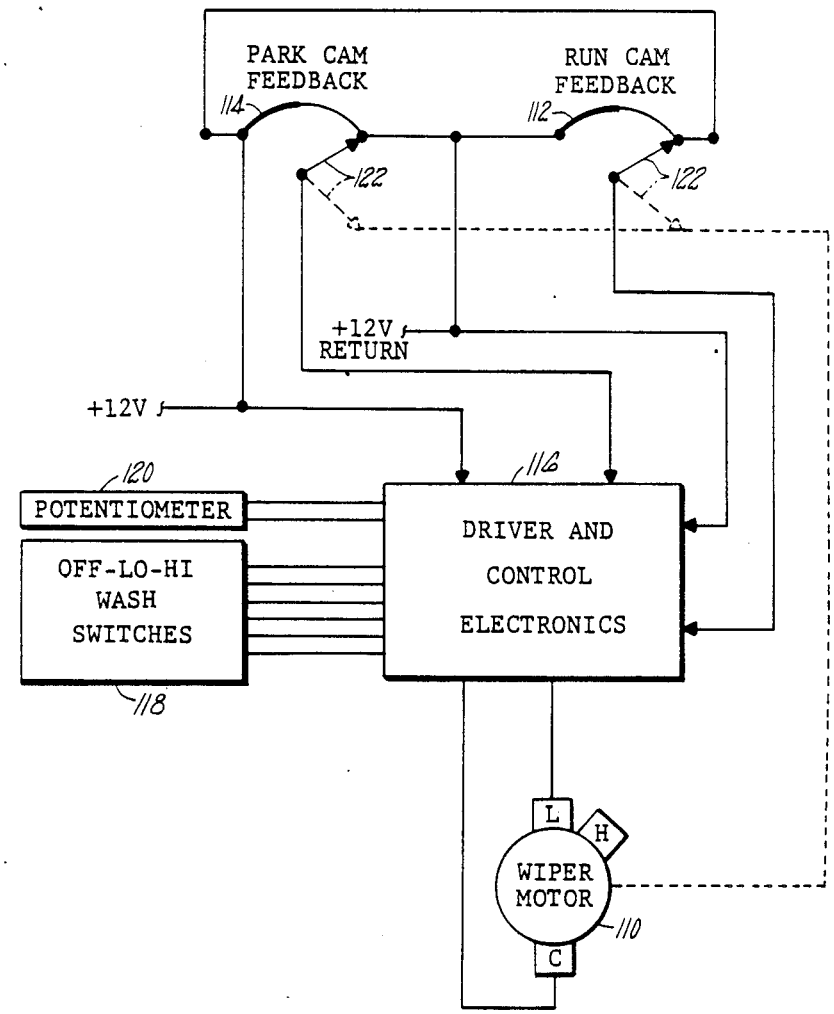
FIG. 1 is a block diagram of one type of window wiper control system in accordance with the prior art.
Figure 2:
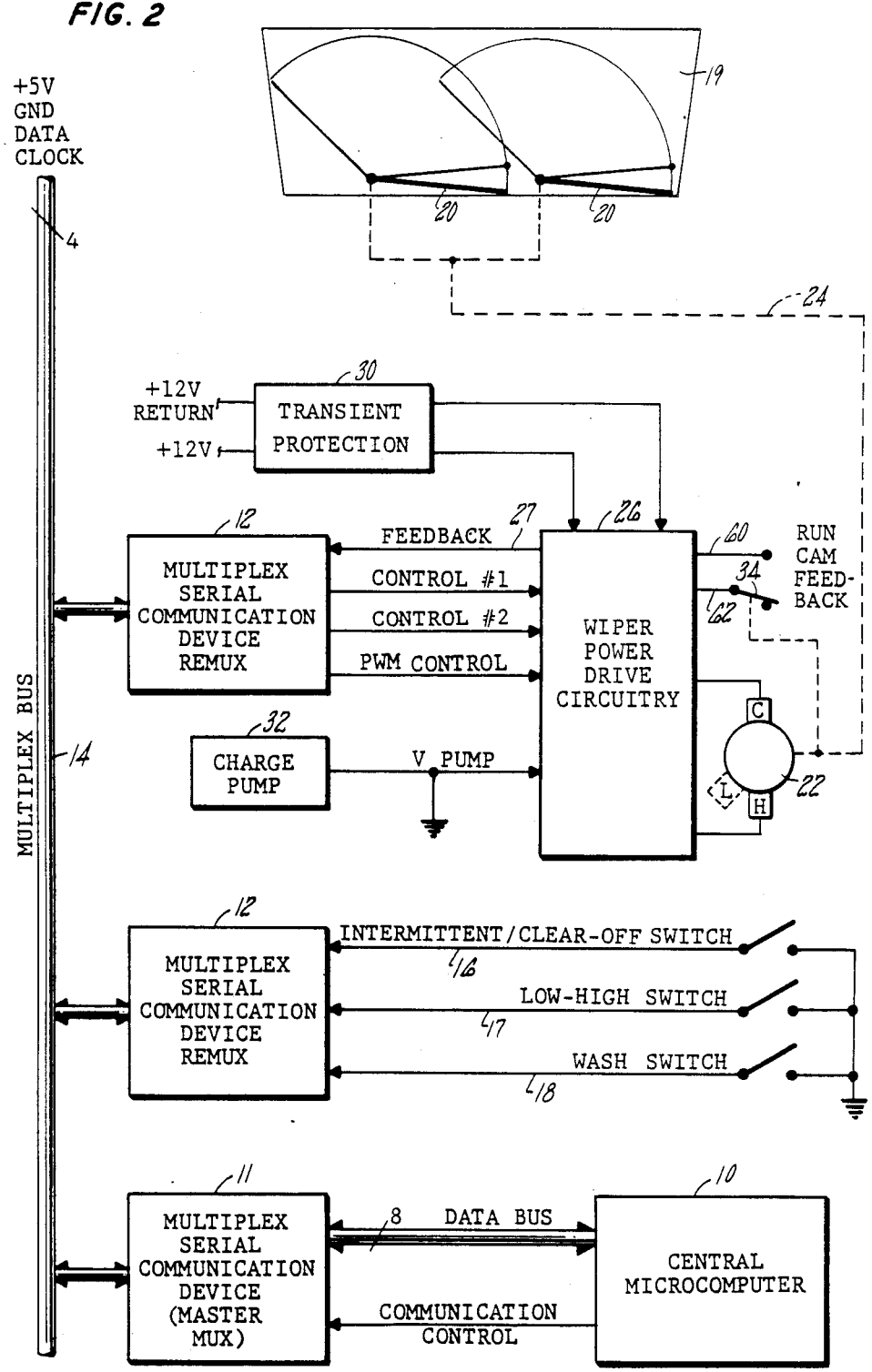
FIG. 2 is a general block diagram illustrating the wiper control system of the invention incorporated as part of a multiplex control system.

Referring to FIG. 2, there is illustrated the wiper control system of the invention incorporated as part of a multiplex control system. The multiplex control system is generally of the configuration and content described in greater detail in the aforementioned U.S. Pat. No. 4,578,591 which is incorporated herein by reference. Briefly, the multiplex control system includes a central microcomputer 10, a master multiplex device, Master Mux 11, and a plurality of slave-type multiplex devices, Remuxes 12. The central microcomputer 10 includes a memory capacity, both ROM and RAM, for storing data and appropriate operating and control programming. The Master Mux 11 transmits and receives data, respectively, to and and from the Remuxes 12. The Remuxes 12 serve as input and/or output interfacing devices. A four-wire multiplex bus 14 provides +5 volt and ground potentials as well as a DATA line and a CLOCK line. The multiplex CLOCK frequency is, for example, 25 KHz. Several discrete switches 16, 17 and 18 selectively provide inputs to one of the Remuxes 12 for commanding various functional responses of the wiper system. Switch 16 controls Intermittent Clear and OFF control, switch 17 controls low/high operation and switch 18 may control a wash pump motor and associated wash cycle, not shown.

In accordance with the invention, one, or more typically two, windshield wipers 20 are driven across a windshield 19 by a permanent magnet motor 22 via connecting linkage 24 by control circuitry structured in accordance with the invention. Typically, input switch 17 will initiate operation of wiper motor 22. The control of motor 22 is effected via a control program stored in microcomputer 10 and transmitted to the motor 22 via one of the Remuxes 12 and wiper power drive circuitry 26. The Remux 12 which serves as an interface between the wiper power drive circuitry 26 and the multiplex bus 14, has the capability of providing certain control signals as logic levels on various outputs thereof. It additionally is capable of converting appropriate data from central microcomputer 10 to a pulse-width modulated (PWM) control signal on yet another output, in a manner described in detail in the aforementioned U.S. Pat. No. 4,578,591. Still further, that Remux 12 is capable of receiving input signals, as for instance, the feedback signal appearing on lead 27. That feedback signal is relayed via the Remux 12 to the central microcomputer 10 for use in a manner to be hereinafter described. The wiper drive circuitry 26 may be provided with appropriate transient protection circuitry 30 between it and the 12 volt DC source for protection from external transients. A charge pump 32 is provided for certain of the circuit elements in the wiper power drive circuitry 26 to be hereinafter described. A cammed Run switch 34 of conventional design provides a signal which indicates a reference position of the wipers 20, 20'.

While the windshield wipers 20, 20' of FIG. 2 are depicted as being a pair of wipers connected and driven by a common linkage, it will be understood that the invention is similarly applicable to a single wiper.

Figure 3:
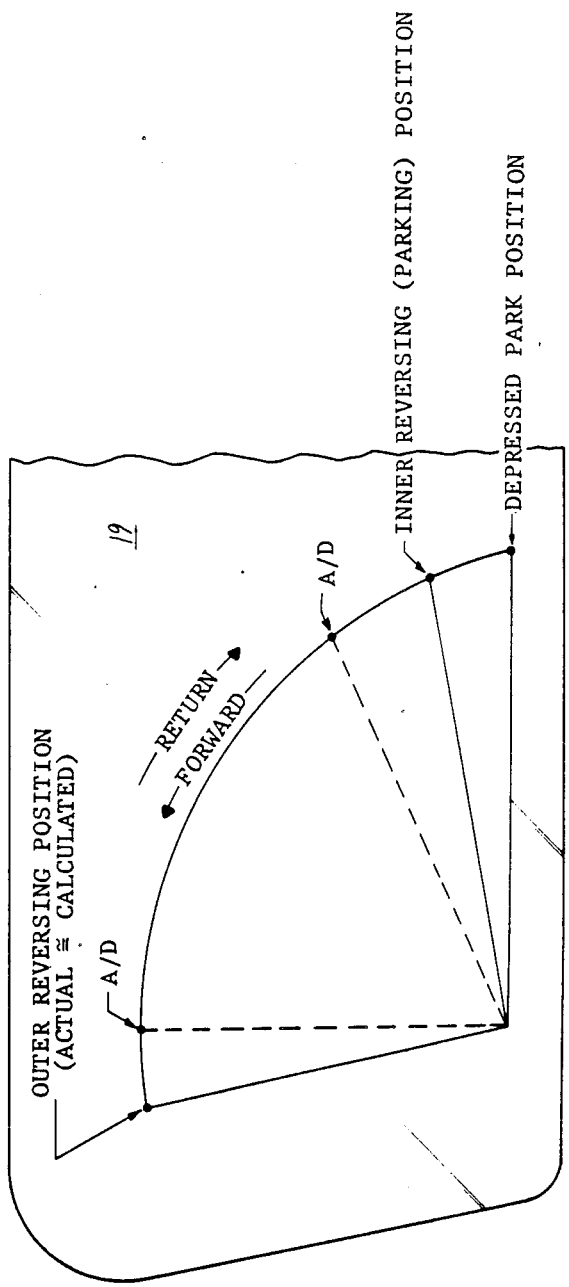
FIG. 3 is a partial diagram of a windshield, from inside a vehicle, functionally illustrating various significant operating positions of a wiper in accordance with the control system of the invention.

Referring to FIG. 3, the stroke or sweep pattern of a single wiper blade is depicted as appearing on a windshield 19. A normal wiping cycle comprises a Forward stroke and Return stroke, with the Forward stroke beginning at an Inner Reversing Position and the Return stroke beginning at an Outer Reversing Position. A third position, designated Depressed Park, represents a common option for storing the wipers out of sight when not in use.

Returning to FIG. 2, the power drive circuitry 26 operates in conjunction with Control #1, Control #2 and PWM Control signals from Remux 12 to regulate the supply of electrical power from the 12 volt source to the motor 22. As depicted in FIG. 2, wiper motor 22 may be of a conventional design having an armature with a common (C) terminal at one end and low (L) and high (H) terminals spaced therealong for low and high speed operation, respectively. However, according to the invention it is only necessary to utilize a pair of terminals for a variety of motor operating speeds. Thus, the low speed terminal (L) has only been shown by dotted line inasmuch it is not used in the present example. The power regulating circuitry 26 responds to the control signals #1 and #2 for determing the direction in which motor 22 rotates. In the illustrated system, the motor 22 only rotates in a single direction during normal Run operation and known structuring of the linkage 24 acts to provide the sweep-reversing function which provides both the Forward and Return strokes. Motor 22 may be reversed by appropriate control of control signals #1 and #2 if it is desired to move the wipers 20, 20' into a depressed park position. The PWM Control signal regulates the supply of power to the wiper motor 22 in a manner which regulates the speed of the motor. In the disclosed embodiment, the PWM Control signal is a two-state (logic 1,0) variable duty cycle control signal having a repetition rate of approximately 50 Hz and being incrementable in 32 steps between zero percent duty cycle and 100% duty cycle.

Figure 4:
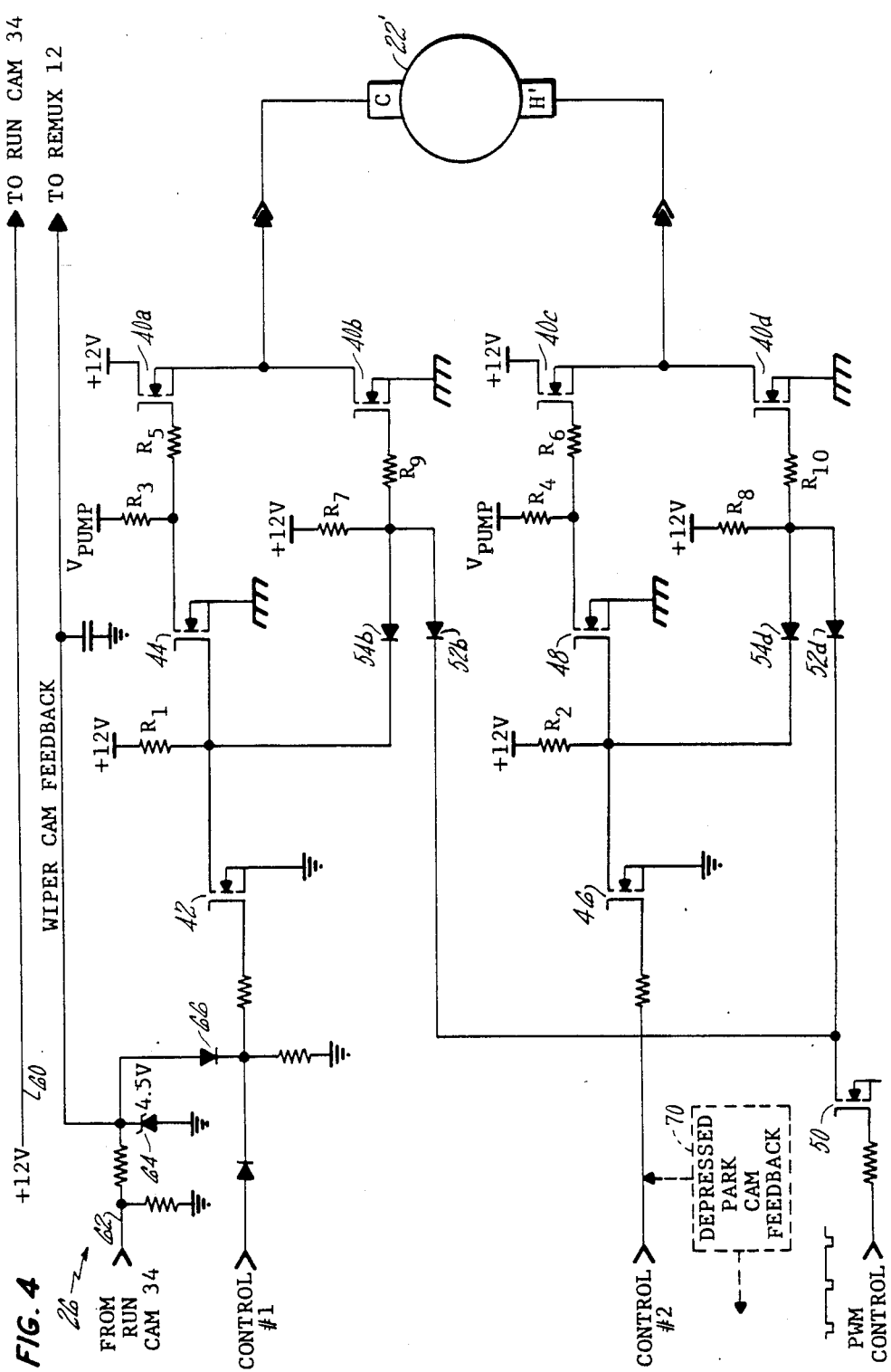
FIG. 4 is a detailed schematic diagram of the wiper power drive circuitry of FIG. 2.

Referring to FIG. 4, the power regulating circuitry 26 of the invention is depicted in greater detail. It should be noted that the windshield wiper motor in this figure has been designated 22' to identify that it does not include a third terminal, i.e. low speed terminal L. Further, its two terminals have been designated C and H' to indicate that it has the capacity for a greater speed than the C, H terminals of motor 22 of FIG. 2. This capability is necessitated if it is desired to provide the same maximum speed capability of motor 22, yet provide the speed regulation characteristics of the invention.

The power regulating circuitry 26 of FIG. 4 provides one or more power MOSFETS connected in series with the motor and across the 12 volt DC supply for regulating the flow of current, and thus power, to the motor. In the simplest situation, it might be possible to provide a single power MOSFET in series with the motor 22' and having its periods of conduction controlled by the PWM Control signal to provide speed regulation. However, most practical windshield wiper systems require bidirectional control of the motor 22' to permit attaining the Depressed Park position. Therefore, it is preferable to provide four power MOSFETS arranged in a so-called "H-bridge" configuration for bidirectionally controlling the flow of current through the motor. The four power MOSFETS are designated 40a, 40b, 40c and 40d, with MOSFETS 40a and 40b being connected to the C terminal of motor 22' and MOSFETS 40c and 40d being connected to the H' terminal. The power MOSFETS 40a–d are N-channel devices, such as Z30's of International Rectifier. They are of relatively low cost and can carry the stall current of motor 22'. A charge pump 32, seen in FIG. 2, provides a V.Pump supply at about 10 volts above the +12 V power source supply, for the high-side, N-Channel power MOSFETS 40a and 40c, as well as for other similar devices in the Remux 12. Conduction by power MOSFETS 40a and 40d provides a current path in one direction through motor 22' for one direction of rotation, and conduction by power MOSFETS 40c and 40b provides a current path in the opposite direction through the motor for reverse rotation.

Further in FIG. 4, two control MOSFETS 42 and 44 are operatively connected in series between the input for the Control #1 signal and the gate of power FET 40 in a manner which turns that power FET "ON" when the Control #1 signal is at a logic 1. Two similar control FETS 46 and 48 are operatively connected in series between the input for the Control #2 signal and the gate of power FET 40c in a manner which turns that power FET "ON" when the Control #2 signal is a logic 1. Conversely, a logic 0 at Control #1 or Control #2 input turns the respective power FET "OFF". Although a logic 1 at the Control #1 or Control #2 input turns the respective high-side power FET 40a or 40c "ON", it is operatively connected to the gate of the respective associated low-side power FET 40b or 40d in a manner which serves to turn that device-"OFF". Thus a logic 1 on one of the Control #1 or Control #2 inputs and a logic 0 on the other of those inputs serves to turn "ON" a pair of power FETS which are connected in series with the motor 22', for instance 40b and 40c. Reversal of that logic signal pattern results in conduction in the opposite direction through the other pair of power FETS. Although one or the other of the low-side power FETS 40b, 40d is turned "ON" and is conducting by virture of an appropriate state of Control #1 or Control #2, the PWM Control signal is extended via a further control MOSFET 50 and diodes 52b and 52d to the gates of respective power FETS 40b and 40d for turning that conducting power FET alternately "ON" and "OFF" in accordance with the duty cycle of the PWM control signal. This PWM Control signal is prevented from turning the presently nonconducting, low-side power FET "ON" by the diodes 54b and 54d in order to prevent a shorted connection through two power FETS connected to the same terminal of the motor.

Figure 4A:
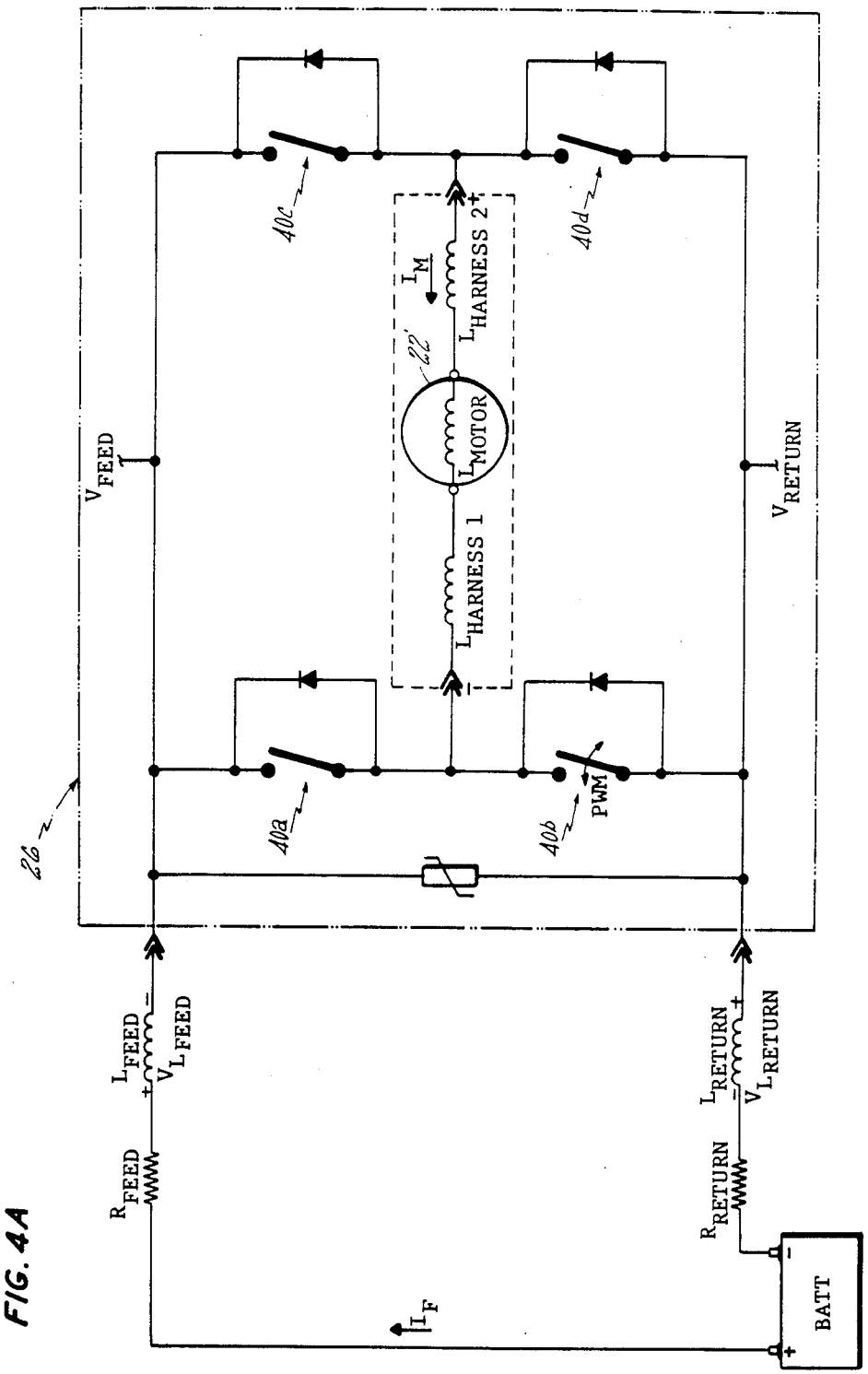
FIG. 4A is a functional equivalent diagram of the circuitry of FIG. 4.

It is generally desirable to change the conductive states of the power FETS and the motor 22' slowly to inhibit or prevent the creation of large rates of current change which would induce undesirable voltage transients. Referring to FIG. 4A there is depicted a functional equivalent diagram of the power feed lines, the wiper power drive circuitry 26 and the wiper motor 22'. The battery, BATT provides the nominal 12 volt supply. The feed line from the positive terminal of the battery to the power drive circuitry 26 includes a lumped resistance $R_{FEED}$ and a lumped inductance $L_{FEED}$. Similarly, the return lead extending from the power drive circuitry 26 to the negative terminal of the battery includes a lumped resistance, $R_{RETURN}$, and a lumped inductance, $L_{RETURN}$. Each of the power MOSFETS 40a-d has been represented by a simple mechanical switch in an open or closed state and includes the reverse body diode normally associated with this type of power MOSFET. For the sake of illustration, the conductive path through the motor is presumed to occur through conducting, high-side power FET 40c and the PWM controlled low-side power FET 40b. Power FETS 40a and 40d are presumed to be nonconducting. The voltages across $R_{FEED}$ and $R_{RETURN}$ are presumed to be negligible. As MOSFET 40b is opened, or becomes nonconductive, two events occur. Firstly, the current $I_F$ from the battery goes to zero at a rate of $dI_F/dt$ which is proportional to the switching speed of the power MOSFET. A relatively slow PWM rate will allow relatively slow switching rates for the power MOSFETS and thus low $dI_F/dt$. By further subdividing one period of the PWM Control signal into 32 parts, it is possible to get the requisite speed control without accelerating the switching times of the various power FETS. A voltage will be generated across the $L_{FEED}$ and $L_{RETURN}$ inductances of a value:

$$V_{LFEED} = -L_{FEED}|dI/dt|$$

$$V_{LRETURN} = -L_{RETURN}|dI/dT|$$

This yields a voltage to the drive circuitry 26 of [BATTERY VOLTAGE + $L_{FEED}|dI/dT|$ + $L_{RETURN}|dI/dt|$]. This voltage may be undesirable, particularly if a large magnitude, because it may lead to destruction of the components in the present drive circuit as well as other associated electronic circuitry. Since it is not possible to eliminate the inductance of the feed and return wiring, it is desirable that the switching speeds on the power MOSFETS be slowed sufficiently to minimize the inductive voltage transients.

Secondly, the wiper motor 22' is also of an inductive nature and stores a sizable amount of energy when current is flowing through it. When MOSFET 40b is opened, the voltage to power MOSFETS 40a and 40b from the motor will rise due to:

$$V_{LMOTOR} = (L_{HARNESS\,1} + L_{MOTOR} + L_{HARNESS\,2})dI/dt + k\omega$$

$$= -(L_{H1} + L_M + L_{H2})|dI/dt| + k\omega.$$

This voltage will rise until the reverse body diode associated with power MOSFET 40a conducts in the forward direction. Once that occurs, current $I_M$ will circulate through the motor 22' and power MOSFETS 40a and 40c as shown until the inductive energy is dissipated into the motor load. While the body diode of power FET 40a is conducting, that FET can be subjected to a secondary breakdown and ½ $V_{RATED}$ breakdown if $V_{FEED}$ is raised above the voltage at the junction of power FETS 40a, 40b and the motor 22'. In consideration of the foregoing, the design of the present circuitry ensures that the lower power FET 40b is not turned back on until the inductive energy of the motor is dissipated, otherwise secondary breakdown and resultant overheating and current "hogging" may occur. Further, the ratings of the power FETS are selected to be at least twice the voltage that can appear between $V_{FEED}$ and $V_{RETURN}$. This is to accommodate for the fact that when the body diode of power FET 40a is conducting and the $V_{FEED}$ voltage is suddenly increased, as by an external transient, the breakdown of the power FET may be ½ its rated breakdown. Therefore, the power FETS are sized for twice the value of any protection provided for transients. Thus, it is important to allow the inductive, as opposed to generative, energy be fully dissipated before switching the power FETS to their complementary "ON"/"OFF" states. This inductive energy must be dissipated, whether braking the motor 22' or, as during speed control using PWM, letting it generate or coast. Speed control using PWM is more efficient if the motor is allowed to generate instead of being braked during the "OFF" portion of each duty cycle. The power dissipated in both the motor 22' and the drive circuitry 26 is minimized by coasting rather than braking during the speed control. This is because braking doesn't allow the inductive energy to circulate and because it depletes the kinetic energy of the moving motor elements. However, braking may be desirable and is provided in those instances when it is desired to quickly stop the motor 22' at a precise position, as for intermittent operation or when terminating operation. Braking is provided by applying the same logic value at both the Control #1 and #2 inputs such that either both high-side power MOSFETS 40a and 40c or both low-side power MOSFETS 40b and 40d conduct and provide a short across motor 22'.

In part for the reasons discussed in the preceding paragraphs, it has been found desirable to provide a PWM Control signal which has a repetition rate which is relatively slow. A PWM Control repetition rate which is below about 500 Hz and preferably is in the range of 30-75 Hz is much more controllable than significantly higher rates. As the repetition rate of the PWM Control signal increases above the preferred range, the efficiency may stay about the same, if switching losses are neglected, but controllability decreases. This effect is due to the inductive nature of the permanent magnet wiper motor 22'. Typically, wiper motors as used in the H-bridge, nonbraked (coasting) configuration of the present invention have inductive energy time constants in the range of 1-2 milliseconds. From 2 to 4 ms of each PWM Control signal period is dedicated to fighting or opposing this inductance. For a PWM Control signal repetition rate of 50 Hz, this inductive time constant only takes about 10% of the PWM period, thus leaving 90% of the period to control the motor. On the other hand, PWM repetition rates which are substantially higher have a much smaller percentage of their period in which they are not opposing the inductance but are controlling the motor. This change in controllability is not linear, but is considerable. Maintaining a constant wipe speed and supply voltage, a PWM Control signal repetition rate of 50 Hz and an "ON" duty cycle of 58% is comparable to a PWM Control signal repetition rate of 500 Hz at an "ON" duty cycle of 82%. For PWM repetition rates above 500 Hz, the motor current $I_M$ never actually goes to zero in the "OFF" portion of the period, but forms a sawtooth waveform of the inductive time constants. Thus, for systems operating at those relatively higher repetition rates, the kinetic energy stored in the motor is not utilized during the "OFF" portion of the PWM duty cycle period. Stated another way, at the relatively low PWM repetition rates preferred by the invention, it is possible to obtain a given speed using a smaller percentage of the period in its "ON" duty cycle. This results in greater latitude in adjusting the duration or percentage of the "ON" portion of the duty cycle and thus a greater range of controllability. The kinetic energy of motor 22', which takes hundreds of milliseconds to be dissipated, is utilized during the "OFF" portion of the PWM duty cycle to maintain the motion of the motor. The supply current and the motor current during the "ON" portion of the PWM period are greater than for the situation of a substantially higher PWM repetition rate. The kinetic energy decay rate for a typical system employing the circuitry of the invention and operating at a conventional "low" wiper speed is hundreds of milliseconds which allows pulse-width modulation rates as low as 30 Hz with essentially no "cogging" effects. It has been noted that operation at this PWM repetition rate is acoustically about the same as a traditional system operating at "low" speed.

Care is taken to avoid cross-conduction between the high-side and low-side MOSFETS connected to the same terminal of motor 22'. If both conduct together, an excessively high current will flow through them, which will also create inductive line voltage transients. This concern arises principally from the switching of the logic states of Control #1 and #2 signals. By proper selection of the control FETS 42, 44, 46 and 48, such cross-conduction may be eliminated. More specifically, if the maximum threshold voltage of the control FETS is lower than the minimum threshold voltage of the power FETS, the conducting power FET connected to a motor terminal will turn "OFF" before the nonconducting power FET connected to the same terminal turns "ON".

For example, assuming Control #2 signal is changed from a logic 0 (0 V) to a logic 1 (5 V), as this occurs control FET 46 turns "ON" and decreases the voltage on the gates of control FET 48 and power FET 40d. Since the minimum "ON" threshold of power FET 40d is above the maximum "ON" threshold of control FET 48, power FET 40d will turn "OFF" before control FET 48 turns "OFF". Power FET 40c cannot turn "ON" until control FET 48 turns "OFF". Thus, there is no overlap of the power FETS 40c and 40d in the "ON" condition. Assuming the Control #2 signal then changes to a logic 0, as that occurs the control FET 46 turns "OFF" and the voltage to the gate of control FET 48 and power FET 40d rises. Since the maximum "ON" threshold of control FET 48 is below the minimum "ON" threshold of power FET 40d, the control FET 48 will turn "ON" before power FET 40d turns "ON". Power FET 40c turns "OFF" when control FET 48 turns "ON". Thus, there is no overlap of the power FETS 40d and 40c in the "ON" condition.

Furthermore, resistors $R_3$-$R_{10}$ control the switching times of the power MOSFETS 40a-d because the switching speeds of those power FETS is, principally a function of the gate voltage charge time. The "turn-on" time of power FET 40c will have a time constant of $(R_4+R_6)*C_{IN}$, where $C_{IN}$ is the input capacitance of power FET 40c. Power FET 40c will have a "turn-off" time constant of $(R_6)*C_{IN}$. Thus, the "turn-on" time is slower than the "turn-off" time, thereby further insuring against cross-conduction. The value of resistance $R_5$ and $R_6$ is made different from that of resistance $R_9$ and $R_{10}$ owing, in part, to the fact that the voltage of $V_{PUMP}$ is greater than the normal supply voltage of 12 volts and unequal charge rates would occur for the power FETS if those resistive values were the same.

In the present embodiment the control FETS are VN1004s, resistors R1 and R2 connected between +12 V and the drains of control FETS 42 and 46 respectively, are 200K ohm; resistors R3 and R4 connected between $V_{PUMP}$ and the drains of control FETS 44 and 48 respectively, are 200K ohm; resistors R5 and R6 respectively, connected between the drains of control FETS 44 and 48 and the gates of power FETS 40a and 40b are 51K ohm; resistors R7 and R8 connected between +12 volt and the anodes of diodes 54b and 54d respectively, are 200K ohm; and the resistors R9 and R10 respectively, connected between the anodes of diodes 54b and 54d and the gates of power FETS 40b and 40d are 22K ohm.

A 12 V signal is extended to Run cam 34 on lead 60. The run cam 34 may extend a logic 1 signal to circuity 26, via lead 62, for controlling the first control FET 42. This may typically supplement a corresponding logic signal provided by system software on the Control #1 input. A 4.5 V Zener diode maintains an appropriate signal level. The signal may be extended to FET 42 via a diode 66 to permit intermittent operation, if required. The logic signal from Run cam 34 is also extended to the Remux 12 via lead 27 to provide the reference position signal which is fed back to microcomputer 10.

If the wiper system possesses the Depressed Park capability for wipers 20, an appropriate cam switch and feedback signal may be provided. This is represented generally by the broken-line block 70, designated "Depressed Park Cam Feedback". That circuitry is similar to that associated with the Run cam 34, however, it serves in a known manner to signal the Depressed Park position via a separate cammed switch. Circuitry 70 is connected to the Control #2 input as well as providing a feedback signal to Remux 12.

Referring now to the wiper motor speed regulating capabilities of the invention, reference is again made to FIG. 3 and further to FIGS. 5A–C, 6, 7, 7A and 7B. Assuming the armature of the motor 22' is capable of providing a motor speed which exceeds the maximum regulated speed by about 25%, one, or several, predetermined regulated speeds or speed profiles of the wipers 20 may be maintained under the invention. In the situation of the FIG. 2 emobidment in which a standard wiper motor 22 is used and assuming the high-speed terminal is used, the maximum regulated speed must be less than the nominal high speed of that motor. Conveniently, the regulated speed for the wipers in that system may correspond to the nominal "low" speed for that motor or some value above that, but below the nominal "high" speed. This limitation is, of course, obviated with the selection of a higher-speed motor 22'.

In a basic profile under the invention, it would be possible to provide a single, constant regulated wiper stroke speed, cycle after cycle, with no provision for controlling acceleration or deceleration near the inflection, or reversing, positions of the wipers. However, it is believed beneficial to gradually decelerate and accelerate the wipers in the regions of their reversing positions so as to lessen strain on the mechanical system and the blades. Moreover, the circuitry of the invention readily accommodates the provision of various speed profiles, one of which is a substantially constant speed during the mid-portion of a sweep, which may include 60–80% of the angular extent of that sweep, and which provides acceleration/deceleration in the remaining portion of the stroke.

Referring to FIG. 5A, there is depicted a timing diagram showing the wiper first in its Depressed Park (D.P.) mode and next in its Run mode. For purposes of the following discussion, attention will be focused on operation during the Run mode. FIG. 5B depicts the waveform of the logic signal from the cammed Run switch 34 which is fed back to the control system circuitry. Again, for puroses of the present invention, focus is on the transition in that waveform which indicates a particular reference event in the wiping cycle. Specifically, the transition from a logic 1 to a logic 0 occurs at the Inner Reversing Position of the cycle, and provides a convenient reference. FIG. 5C presents a timing diagram of the aforementioned basic mode of control in which a substantially constant regulated speed is maintained throughout the entirety of a Forward stroke or a Return stroke. Such regulation is effected by any needed adjustment between successive cycles.

Referring to FIG. 6, there is depicted a timing diagram similar to that of FIG. 5C, but in which additional provision has been made for accelerating (A) and decelerating (D) the motor and wipers near the reversing positions. It should be understood that this Figure represents a time-base, rather than a displacement (angular) base. It will normally be the case to define or specify a particular wiping cycle interval or period to which subsequent cycle intervals are held by speed regulation, which is in turn effected by adjustment of the duty cycle of the PWM control signal, as required. If a desired wipe cycle interval is predetermined, a duty cycle for the PWM control signal may be computed or determined empirically to provide motor and wiper speeds which meet that interval. That PWM control signal may then become the nominal value which is loaded in microcomputer 10 and is later adjusted by operation and/or acceleration/deceleration profiling. Although the diagram of FIG. 6 does not actually depict speed changes during the acceleration and deceleration intervals, such are implied and may be linear or nonlinear, as dictated by ease of implementation and/or the dynamics of the wiper system.

Figure 7:
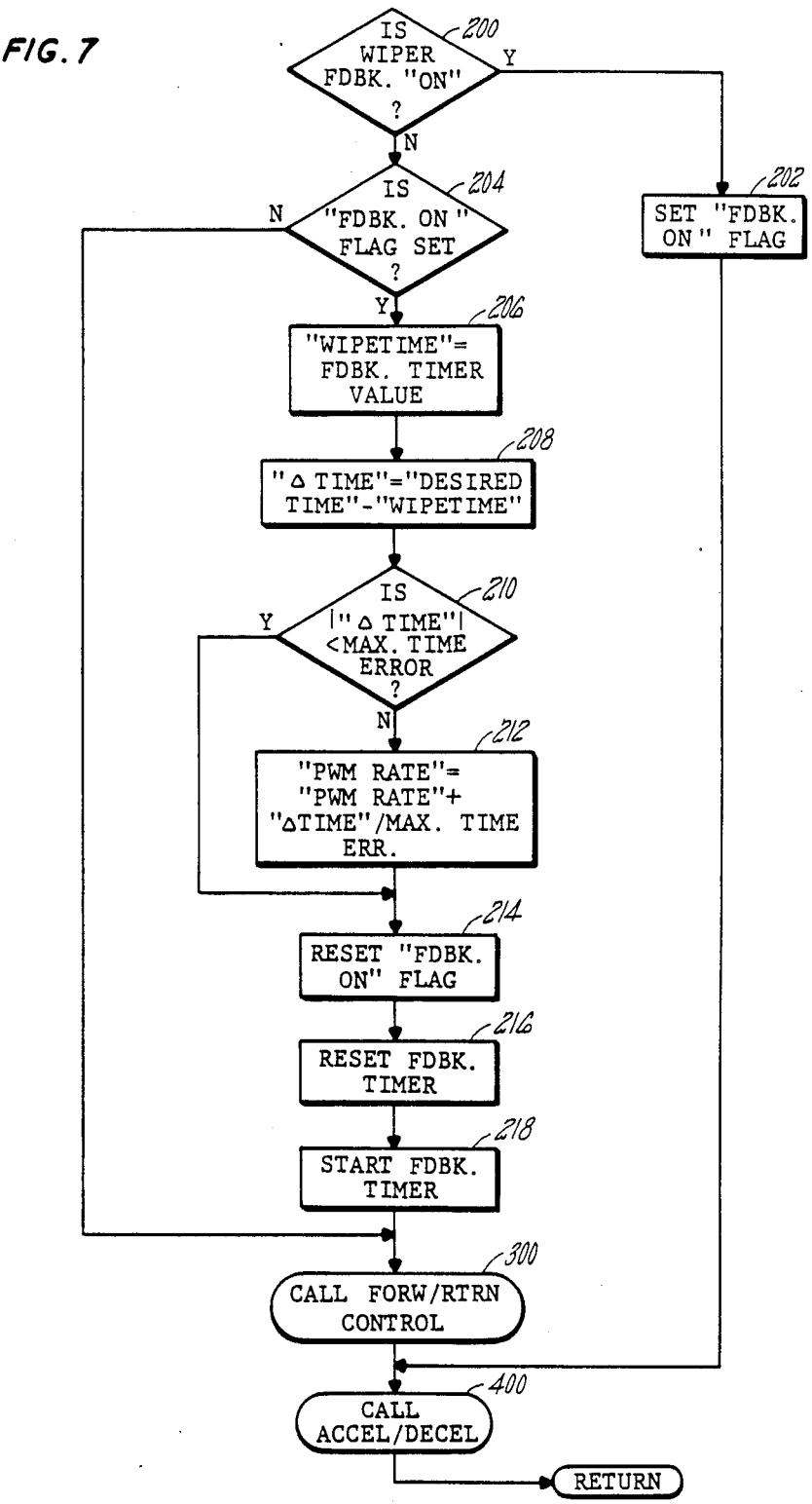
FIG. 7 is a generalized flow diagram of the main wiper speed control routine in accordance with the invention.

Referring to FIG. 7, there is depicted a flow diagram of the main routine for effecting speed control. The program for practicing this routine is stored in microcomputer 10 and is part of an overall operating program associated with multiplexed controls of various electrical functions in an automobile. The routine is entered at step 200 with the inquiry "Is wiper feedback 'on'?". This is responding to the logic signal from cammed Run switch 34 and results in a "no" if logic 0 and a "yes" if logic 1. Because a logic 1 precedes the logic 0, a "yes" will act via step 202 to set the "feedback on" flag. However, when the answer becomes "no" as a result of the signal going to logic 0, an inquiry is made at step 204 to see if the "feedback on" flag is set. Assuming it had been, a "no" represents the occurrence of the reference transition signal and serves to begin timing of the wiping cycle from that time. The next step, 206, determines that "Wipetime equals the value of the feedback timer". The feedback timer exists in the microcomputer 10 and will, following the first timed cycle, have accumulated a count representative of the actual interval for the just-completed wiping cycle. Then at 208 the actual "wipetime" is arithmetically subtracted from a stored "desired time" to determine a "Δtime", which represents any difference in magnitude and arithmetic sign. The "desired time" is that normally-permanent value stored in memory and representing the desired average speed or cycle interval. For instance, "desired time" may be 1.4 seconds which corresponds with a conventional "low" wiper speed. Clearly, other "desired times" may be prestored in the system as well to provide a variety of selectable speeds.

Once "Δtime" is determined, a determination is made at 210 whether the absolute value of "Δtime" is less than some maximum allowable time error, the routine jumps to steps 214, 216 and 218. However, if the "Δtime" exceeds the allowable limit, the routine goes to step 212 which adjusts the duty cycle of the PWM control signal by changing the former PWM duty cycle by an amount represented by "Δtime"/"max time error". The "maximum allowable time error" value is selected to correspond with the smallest increment by which the duty cycle of the PWM may be adjusted. Further, assuming some predetermined nominal PWM duty cycle for the desired interval, as for instance 24 of 32 for a 75% duty cycle, and that such duty cycle represents a particular wiper speed, or more accurately wiper cycle interval, then each increment of the duty cycle adjustment about that nominal value will shift the speed or interval by roughly 1/24 of the former value, particularly if relatively few steps are made.

Having either retained the old "PWM Rate" or adjusted it and provided a new one, the routine moves to step 214 which resets the "feedback on" flag; then to step 216 which resets the "feedback timer"; and then to step 218 which starts the "feedback timer". These steps occur in rapid sequence and serve to condition the control system for beginning a new wiper cycle for attaining the desired interval. It should be understood that the first wiper cycle at start-up will use a nominal, prestored PWM duty cycle. Moreover, either that first cycle or the start of the next cycle will provide the first occurrence of the reference signal from which the interval is timed. Then, after one timed interval has occurred, it is possible to evaluate that interval and subsequent intervals for possible "Δtimes". In fact, it may be appropriate to provide a separate one-cycle, start-up routine which does not look for a "Δtime" at its start, but which does run the feedback timer in order to obtain a "wipetime" value at the end of the first wiper cycle.

The next step in FIG. 7 is 300. It is normally reached directly from step 204 once the "feedback on" flag has been reset at 214. Step 300 calls the "Forward/Return" control routine depicted in FIG. 7A. Completion of that routine moves to step 400 which calls the "Acceleration/Deceleration" routine depicted in FIG. 7B.

Figure 7A:
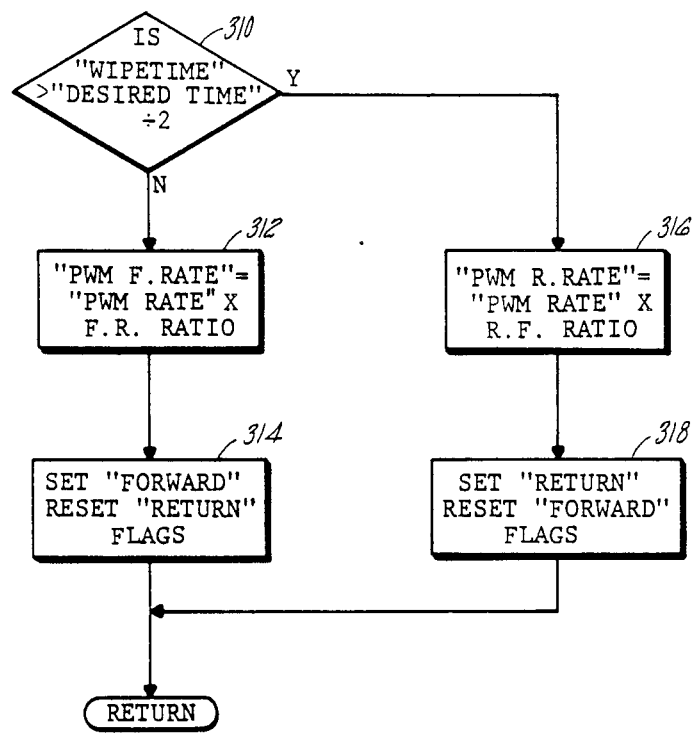
FIG. 7A is a generalized flow diagram of a principal control routine called by the routine of FIG. 7.

Referring to FIG. 7A, the initial step 310 in the "Forward/Return" routine determines whether the "wipetime" is greater than "desired time"/2. It will be recalled that "wipetime" represents the running count of the actual time since the beginning of the wipe cycle. Initially, that response will be "no" and the routine moves to step 312 which sets the "PWM rate", i.e. duty cycle, for the appropriate "forward" sweep speed. Step 314 sets a "forward" flag and resets a "return" flag. When at step 310 it is determined that "wipetime" exceeds one half of "desired time", as should normally happen at the Outer Reversing Position of the wiper stroke, the routine moves to step 316 which sets the "PWM rate", i.e. duty cycle, for the appropriate reverse sweep speed. Step 318 sets a "return" flag and resets a "forward" flag. It is appropriate to note that in the event the natural ratio of the Forward and Return stroke intervals is acceptable, steps 300 and 310-318 may be omitted. On the other hand, assuming the natural ratio is not acceptable, as for instance where the Forward stroke is naturally 10% slower than the Return stroke but it is desired that they operate at the same speed, then correction must be made. The most convenient way to effect such correction is to determine the natural "forward-to-return" ratio and multiply the "PWM Rate" by that value to get the Forward PWM rate. Conversely, the "PWM Rate" is multiplied by the reciprocal, or "return-to-forward" ratio to get the Return PWM rate.

Referring to FIG. 7B, the initial step 410 in the "Acceleration/Deceleration" routine establishes a time value, identified as "halfwipe", which is one-half of the measured "wipetime" interval for the just-completed wipe cycle. Thus the time value of "halfwipe" should coincide with the wiper reaching the "Outer Reversing Position" at the end of the Forward stroke. Then at step 412 it is determined if the "feedback timer is less than the A(acceleration) time". The "A time" is the predetermined duration of the acceleration interval, as measured from the start of the Forward stroke. Assuming it is still less than "A time", the routine branches to step 414 which determines if "X time" has elasped "since last motor change". In the present embodiment, the value of "X time" corresponds with the period of PWM Control signal, or 20 milliseconds. Assuming "X time" has elasped, the routine goes to step 416 which sets the PWM control duty cycle to the next value or count in a prestored "acceleration" table. If "X time" has not elasped, the present PWM Control duty cycle value is maintained and a return is made to the start of the routine. It is expected that during an acceleration or deceleration interval, the PWM duty cycle will step about 10% (i.e. about 3 of 32 counts) every 20 milliseconds, though it will be understood that the steps may be of greater or lesser magnitude, that no step may be made after some "X time" intervals and/or that the value of "X time" may be a multiple of PWM Control signal periods.

Returning to step 412, if the feedback time is no longer less than "A time", then at step 418 it is determined if that time is less than "halfwipe - D time". This identifies whether the wiper has yet entered the deceleration region prior to the Outer Reversing Position. Assuming it has not yet arrived at that point in time, a "yes" response steps the routine to 420 which calls for setting the PWM Control duty cycle to "PWM FRATE", which corresponds with the value determined for the major midportion of the Forward Sweep. This continues until the answer at 418 is "no", signifying that the deceleration interval has been entered. At 422 it is determined if the value of the feedback timer is less than "halfwipe" and if "yes", the routine goes to step 424 which is the same as 414. If "X time" has elapsed, step 426 sets the PWM control duty cycle to the next value in a predetermined "deceleration" table. If "X time" has not elasped, the present PWM Control duty cycle value is maintained and a return is made to the start of the routine.

If at step 422 it was determined the feedback time was no longer less than "halfwipe", the routine moves to step 428 to determine if the time is less than "halfwipe +A time". This is seeking to identify the acceleration interval following the Outer Reversing Position. If a "yes", then the routine jumps to step 414 to practice the "acceleration" routine. If a "no", then the routine steps to 430 which determines if the feedback time is less than wipetime - D time. If "yes", then the wiper is operating in the major midportion of the Return stroke and step 432 appropriately sets the PWM Control duty cycle to "PWM RRATE". If "no", signifying entry into the deceleration region prior to completion of the Return stroke, the routine would jump to step 424 to practice the "deceleration" routine.

It should be understood that a variety of "midsweep" speeds are possible, as are a variety of acceleration and/or deceleration profiles. Indeed, the acceleration profile need not be symmetrical with the deceleration profile nor does the acceleration/deceleration profile for the Forward stroke have to be the same as for the Return stroke. All that is required is that the profiles be pre-identified sufficiently for establishing appropriate tables of PWM Control duty cycle values and that the intervals of the acceleration/deceleration/and midstroke routines be predetermined for the purpose of determining a cumulative interval for the full wipe cycle which in turn is used to establish the "desired time" to which the "wipetime" is controlled.

If the wiper system is to include an "intermittent" capability whereby a dwell, or apparent dwell, exists between successive wipe cycles, it is possible to select and enter such a delay interval into the microcomputer in the manner described in the aforementioned U.S. Pat. No. 4,578,591 by "dwelling" on switch 16 for the desired interval. That dwell interval may then be applied between the completion of a prior wipe cycle and the start of a new wipe cycle without starting the feedback timer, which measures the wipe cycle interval, until the dwell timer has timed out. The wiper is normally at rest while the dwell timer times out. At that point, a reference signal or a pseudo reference signal may be generated to signify the start of a wipe cycle for the general speed-control purposes described earlier.

In a modification of conventional "intermittent" operation, it is possible through the speed profiling capability of the present invention to provide an apparent dwell during which the wiper, or wipers, continue to move, but at a speed which is greatly reduced from that at mid-stroke. Stated another way, the acceleration and deceleration intervals adjacent to the Inner and Outer Reversing Positions may be profiled in such a manner and over such an interval that they occupy several seconds of time, even though they occupy only possibly 20-30% of the full angular sweep of the wiper. During part of these intervals, the wiper speed may be quite slow, being at an extreme of the operable PWM Control duty cycle range. However, if the total cycle interval, including that for slow wiper movement during this form of dwell, is preselected, it is possible to obtain an apparent dwell in this manner by relying on an extreme profiling of the accceleration and deceleration intervals. Such preselection of the total cycle interval will typically include a basic prestored interval for the normal run speed and a further operator-determined interval for the apparent dwell.

Referring to the timing diagram of FIG. 8, there is depicted a timing diagram which is similar to that of FIG. 6 in that it includes provision for acceleration and deceleration intervals as well as the normal mid-stroke speed control. However, FIG. 8 also depicts the provision of an apparent dwell by the considerable extension of the acceleration and deceleration intervals. It should be recalled that the baseline of the diagram depicts time, rather than sweep angle, with a full wipe cycle possibly embracing 10 seconds, or more. FIG. 8 also includes an additional detail implied, but not shown, in FIG. 6. Specifically, the vertical amplitude of the waveform of the timing diagram has been scaled to reflect relative PWM Control signal duty cycles and thus, relative motor speeds across a wipe cycle. It will be noted that a maximum, constant speed occurs during the mid-sweep portions of the cycle and that the speeds are lower by steps in the acceleration and deceleration intervals. Also, it should be understood that each speed level may typically include many repetitions of the PWM Control signal at the particular duty cycle for that speed. Thus, although the "X time" values depicted in steps 414 and 424 of FIG. 7B may be retained as the 20 ms period of each PWM Control signal, a particular duty cycle value may be called many times in repetition before stepping to a new value in accordance with a pre-established table of speed profile values.

Although this invention has been shown and described with respect to detailed embodiments thereof, it will be understood by those skilled in the art that various changes in the form and detail thereof may be made without departing from the spirit and scope of the claimed invention.

Having thus described a typical embodiment of the invention, that which is claimed as new and desired to secure by Letters Patent of the United States is.

1. Improved drive circuitry for a bidirectional inductive DC motor, the motor having first and second terminals for operative connection with a source of DC electrical power, said drive circuitry being for connection in series with said motor terminals across the source of DC electrical power and comprising:
   four power MOSFETS operatively connected to said motor terminals in H-bridge configuration across the power source, including first and second high-side power MOSFETS operatively connected to said first and said second motor terminals respectively and first and second low-side power MOSFETS operatively connected to said first and said second motor terminals respectively;
   first and second input terminal means for receiving first and second control signals respectively, each said control signal being one of two logic states;
   first switching means operatively connected between said first input terminal and the gates of said first high-side and said first low side power MOSFETS for controlling conduction of said first high-side and said first low-side power MOSFETS in substantially complementary fashion; and
   second switching means operatively connected between said second input terminal and the gates of said second high-side and said second low-side power MOSFETS for controlling conduction of said second high-side and said second low-side power MOSFETS in substantially complementary fashion.

2. The motor drive circuitry of claim 1 wherein said first switching and said second switching means each include respective control MOSFET means.

3. The motor drive circuitry of claim 2 wherein each said control MOSFET means includes a series pair of control MOSFETS, said pair of control MOSFETS being connected between a respective said input terminal and the gate of one of the respective high-side and low-side power MOSFETS, and one control MOSFET of said pair being connected between the respective said input terminal and the gate of the other of the respective said high-side and low-side power MOSFETS.

4. The motor drive circuitry of claim 2 wherein the respective control MOSFET means of said first and said second switching means have predetermined maximum threshold voltages and the respective said power MOSFETS have predetermined minimum threshold voltages which are higher than said maximum threshold voltages of said control MOSFET means thereby to impede cross-conduction between respective high-side and low-side power MOSFETS.

5. The motor drive circuitry of claim 4 wherein said power MOSFETS each include respective inherent input capacitances and said first and second switching means include respective resistive means operatively connected to the gates of the respective said power MOSFETS, said resistive means being structured and preselected to provide, in combination with said respective input capacitances, turn-on time constants which are longer than the corresponding turn-off time constants for the respective power MOSFETS thereby to further impede cross-conduction between respective high-side and low-side power MOSFETS.

6. The motor drive circuitry of claim 1 wherein both of said control signals received at said first and second input terminals may concurrently be of the same logic state, that said logic state being operative to effect conduction of said first and second high-side power MOSFETS of said first and second low-side power MOSFETS concurrently for braking the motor.

7. The motor drive circuitry of claim 1 further including a third input terminal means for receiving a pulse-width modulated control signal and circuit means for extending said pulse-width modulated control signal from said third input terminal only to each of said first and second low-side power FETS of said four power MOSFETS for controlling the speed of the motor.

8. The motor drive circuitry of claim 7 wherein normally only one of said first and second low-side power MOSFETS is rendered conductive at a time by said control signals received at said first and second input terminals and said circuit means for extending said pulse-width modulated control signals to said first and second low-side power MOSFETS is operative to further regulate the conduction only of said one of said first and second low-side power MOSFETS rendered conductive by said control signals at said first and second input terminals.

9. The motor drive circuitry of claim 8 wherein said pulse-width modulated control signal has a predetermined repetition rate, said repetition rate being less than about 500 Hz.

10. The motor drive circuitry of claim 9 wherein said repetition rate of said pulse-width modulated control signal is in the range of 30–75 Hz.

11. The motor drive circuitry of claim 9 wherein said motor is a window wiper motor.

12. The motor drive circuitry of claim 9 wherein each said power MOSFET includes a diode and said pulse-width modulated control signal is operative to selectively terminate conduction of said regulated one of said first and second low-side power MOSFETS for a portion of the period defined by said repetition rate, and wherein the duration of any said terminated conduction at least exceeds a minimum interval required for recovery of a said power MOSFET diode.

13. The motor drive circuitry of claim 12 wherein there is provided transient protection circuitry operatively connected between the source of DC electrical power and said drive circuitry for preventing voltage transients greater than a predetermined amplitude to said drive circuitry and wherein at least each of said high-side power MOSFETS has a minimum breakdown voltage which is at least twice said predetermined amplitude of said voltage transient protection.

* * * * *

UNITED STATES PATENT AND TRADEMARK OFFICE
CERTIFICATE OF CORRECTION

PATENT NO.   : 4,705,997
DATED        : November 10, 1987
INVENTOR(S)  : D. L. Juzswik It is certified that error appears in the above-indentified patent and that said Letters Patent is hereby corrected as shown below:

Column 3, line 1, "powwer" should be --power--.

Column 3, line 44, after "high-side", delete the second occurrence of "and".

Column 17, line 13 (claim 6), following "FETS" insert --or--.

Signed and Sealed this

Eighteenth Day of January, 1994

Attest:

BRUCE LEHMAN

*Attesting Officer*    Commissioner of Patents and Trademarks